United States Patent
Chen et al.

(10) Patent No.: US 12,305,897 B2
(45) Date of Patent: May 20, 2025

(54) AIR CONDITIONING SYSTEM WITH MULTI-TEMPERATURE ZONE, CONTROL METHOD THEREFOR AND TRANSPORT REFRIGERATION VEHICLE

(71) Applicant: Carrier Corporation, Palm Beach Gardens, FL (US)

(72) Inventors: Kun Chen, Shanghai (CN); Linhui Chen, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 183 days.

(21) Appl. No.: 18/158,864

(22) Filed: Jan. 24, 2023

(65) Prior Publication Data
US 2023/0235931 A1   Jul. 27, 2023

(30) Foreign Application Priority Data
Jan. 26, 2022 (CN) .......................... 202210092233.3

(51) Int. Cl.
*F25B 41/26* (2021.01)
*B60H 1/32* (2006.01)
(Continued)

(52) U.S. Cl.
CPC ........... *F25B 41/26* (2021.01); *B60H 1/3228* (2019.05); *B60H 1/323* (2013.01); *B60H 1/3232* (2013.01);
(Continued)

(58) Field of Classification Search
CPC .... B60H 1/3228; B60H 1/323; B60H 1/3232; B60H 1/00907; B60H 2001/00935; B60P 3/20; F25B 13/00; F25B 40/02; F25B 41/24; F25B 41/26; F25B 2313/023; F25B 2313/02742
See application file for complete search history.

(56) References Cited

U.S. PATENT DOCUMENTS

| 5,168,713 A | 12/1992 | Howland |
| 2019/0331375 A1* | 10/2019 | Tanaka ................... F25B 47/02 |

FOREIGN PATENT DOCUMENTS

| CN | 112902536 A | 6/2021 |
| EP | 1371921 A1 | 12/2003 |

(Continued)

OTHER PUBLICATIONS

European Search Report for Application No. 23152511.4, Issued Jun. 15, 2023, 8 Pages.

*Primary Examiner* — Jonathan Bradford
(74) *Attorney, Agent, or Firm* — CANTOR COLBURN LLP

(57) ABSTRACT

A multi-temperature air conditioning system, a control method thereof and a transport refrigeration vehicle. The multi-temperature air conditioning system includes an outdoor unit; a first indoor unit; and a second indoor unit; a number of a first four-way valves corresponds to the number of the first indoor units, and a number of a second four-way valves corresponds to the number of the second indoor units; and a section flow path which could be connected or disconnected is further included, which connects the first indoor unit between the first throttling element and the first on-off valve, and connects the second indoor unit between the second throttling element and the second on-off valve.

10 Claims, 1 Drawing Sheet

(51) Int. Cl.
  *F25B 13/00* (2006.01)
  *F25B 40/02* (2006.01)
  *F25B 41/24* (2021.01)
  *B60H 1/00* (2006.01)
  *B60P 3/20* (2006.01)

(52) U.S. Cl.
  CPC .............. *F25B 13/00* (2013.01); *F25B 40/02* (2013.01); *F25B 41/24* (2021.01); *B60H 1/00907* (2013.01); *B60H 2001/00935* (2013.01); *B60P 3/20* (2013.01); *F25B 2313/023* (2013.01); *F25B 2313/02742* (2013.01); *F25B 2400/0403* (2013.01); *F25B 2400/0409* (2013.01); *F25B 2400/0411* (2013.01)

(56) References Cited

FOREIGN PATENT DOCUMENTS

| | | | |
|---|---|---|---|
| EP | 3415839 A1 * | 12/2018 | ............... F24H 1/00 |
| WO | 2014050099 A1 | 4/2014 | |

* cited by examiner

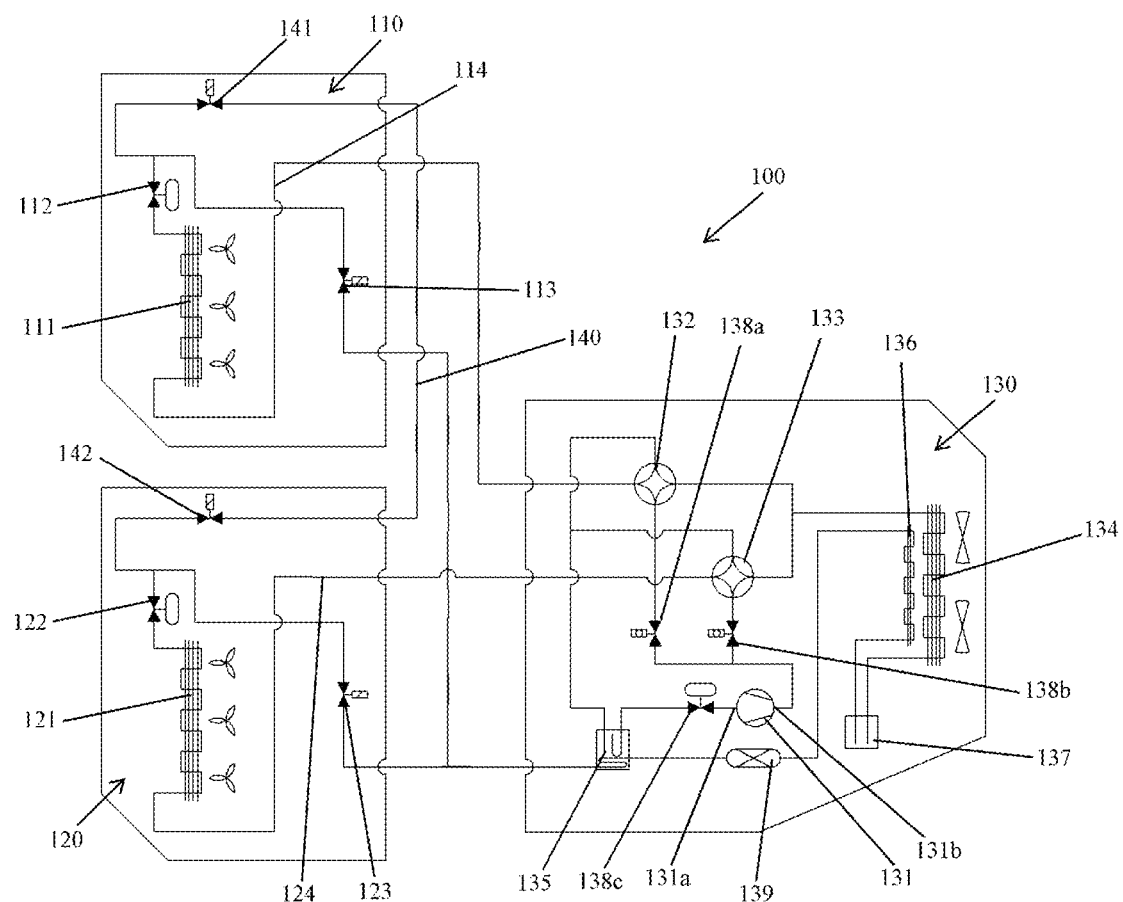

AIR CONDITIONING SYSTEM WITH MULTI-TEMPERATURE ZONE, CONTROL METHOD THEREFOR AND TRANSPORT REFRIGERATION VEHICLE

FOREIGN PRIORITY

This application claims priority to Chinese Patent Application No. 202210092233.3, filed Jan. 26, 2022, and all the benefits accruing therefrom under 35 U.S.C. § 119, the contents of which in its entirety are herein incorporated by reference.

FIELD OF THE INVENTION

The present application relates to the field of temperature regulation of transport vehicles, and in particular to a multi-temperature air conditioning system, a control method thereof and a transport refrigeration vehicle.

BACKGROUND OF THE INVENTION

At present, the cold chain transport industry usually uses the refrigeration cycle and the hot gas bypass cycle of the transport refrigeration unit to provide whole region cooling or heating function for different cargo zones of the transport vehicle. At the same time, when heating and cooling are required separately for different cargo zones, it usually requires the operation of the refrigeration system and electric heating at the same time, which requires extra power consumption in addition to the power consumption of the refrigeration system, thus leading to low-efficient system operation.

In addition, when the whole region heating function is in operation, since the only heat source of the system is heat from the compressor motor when hot gas bypass heating is used, the heating effect of the system is limited, and the heating effect is poor. More often, the whole region heating function can only be achieved by using hot gas bypass and electric heating simultaneously, which results in low-efficient system operation of heating.

Under the backdrop of energy conservation and emission reduction, there is an urgent need to develop and promote a high-efficient and energy-saving multi-temperature air conditioning system, a control method thereof and a transport refrigeration vehicle.

SUMMARY OF THE INVENTION

The present application aims to provide a multi-temperature air conditioning system, a control method thereof and a transport refrigeration vehicle, so as to at least partially solve or alleviate the problems existing in the prior art.

To achieve at least one object of the present application, according to one aspect of the present application, a multi-temperature air conditioning system is provided, which comprises: an outdoor unit, in which a compressor, a first four-way valve, a second four-way valve and an outdoor heat exchanger connected through pipelines are arranged; a first indoor unit, in which a first indoor heat exchanger, a first throttling element and a first on-off valve are respectively arranged, wherein a first end of the first indoor heat exchanger is connected to the outdoor heat exchanger through the first throttling element and the first on-off valve, and a second end of the first indoor heat exchanger is connected to the compressor through the first four-way valve; and a second indoor unit, in which a second indoor heat exchanger, a second throttling element and a second on-off valve are respectively arranged, wherein a first end of the second indoor heat exchanger is connected to the outdoor heat exchanger through the second throttling element and the second on-off valve, and a second end of the second indoor heat exchanger is connected to the compressor through the second four-way valve; wherein the first four-way valve is respectively connected to a gas inlet of the compressor, the outdoor heat exchanger, the first indoor heat exchanger, and is capable of being connected to or disconnected from a gas outlet of the compressor; the second four-way valve is respectively connected to the gas inlet of the compressor, the outdoor heat exchanger, the second indoor heat exchanger, and is capable of being connected to or disconnected from the gas outlet of the compressor; and wherein the number of the first four-way valves corresponds to the number of the first indoor units, and the number of the second four-way valves corresponds to the number of the second indoor units; and wherein a section flow path which could be connected or disconnected is further included, which connects the first indoor unit between the first throttling element and the first on-off valve, and connects the second indoor unit between the second throttling element and the second on-off valve.

In addition to one or more of the above features, or as an alternative, in another embodiment, the section flow path comprises: a first section on-off control valve located in the first indoor unit; and a second section on-off control valve located in the second indoor unit.

In addition to one or more of the above features, or as an alternative, in another embodiment, the multi-temperature air conditioning system further comprises: a gas-liquid separator arranged upstream of the gas inlet of the compressor; a subcooling flow path connected between the outdoor heat exchanger and the first throttling element and the second throttling element, wherein the subcooling flow path flows through the interior of the gas-liquid separator; and a subcooler arranged between the outdoor heat exchanger and the first throttling element and the second throttling element.

To achieve at least one object of the present application, according to one aspect of the present application, a control method for the aforementioned multi-temperature air conditioning system is provided, which comprises: a first zone cooling and heating mode of alternatively switching the first four-way valve or the second four-way valve to connect the pipeline connection between the first four-way valve or the second four-way valve and the gas outlet of the compressor accordingly, turning off the first on-off valve and the second on-off valve, and connecting the section flow path, so that the refrigerant flows sequentially through the gas outlet of the compressor, the first four-way valve, the first indoor heat exchanger, the first throttling element, the section flow path, the second throttling element, the second indoor heat exchanger, the second four-way valve and the gas inlet of the compressor; or the refrigerant flows sequentially through the gas outlet of the compressor, the second four-way valve, the second indoor heat exchanger, the second throttling element, the section flow path, the first throttling element, the first indoor heat exchanger, the first four-way valve and the gas inlet of the compressor.

In addition to one or more of the above features, or as an alternative, in another embodiment, the control method further comprises: a second zone cooling and heating mode of alternatively switching the first four-way valve or the second four-way valve to connect the pipeline connection between the first four-way valve and the second four-way valve and the gas outlet of the compressor, turning off the first on-off valve or the second on-off valve accordingly, and connecting the section flow path, so that a first part of refrigerant flows sequentially through the gas outlet of the compressor, the first four-way valve, the outdoor heat exchanger, the first on-off valve, the first throttling element, the first indoor heat exchanger, the first four-way valve and the gas inlet of the compressor; and a second part of refrigerant flows sequentially through the gas outlet of the compressor, the second four-way valve, the second indoor heat exchanger, the second throttling element, the section flow path, the first throttling element, the first indoor heat exchanger, the first four-way valve and the gas inlet of the compressor; or the first part of refrigerant flows sequentially through the gas outlet of the compressor, the second four-way valve, the outdoor heat exchanger, the second on-off valve, the second throttling element, the second indoor heat exchanger, the second four-way valve and the gas inlet of the compressor; and the second part of refrigerant flows sequentially through the gas outlet of the compressor, the first four-way valve, the first indoor heat exchanger, the first throttling element, the section flow path, the second throttling element, the second indoor heat exchanger, the second four-way valve and the gas inlet of the compressor.

In addition to one or more of the above features, or as an alternative, in another embodiment, the control method further comprises: a whole region cooling mode of connecting the pipeline connection between the first four-way valve and the second four-way valve and the gas outlet of the compressor, turning on the first on-off valve and the second on-off valve, and disconnecting the section flow path, so that the first part of refrigerant flows sequentially through the gas outlet of the compressor, the first four-way valve, the outdoor heat exchanger, the first on-off valve, the first throttling element, the first indoor heat exchanger, the first four-way valve and the gas inlet of the compressor; and the second part of refrigerant flows sequentially through the gas outlet of the compressor, the second four-way valve, the outdoor heat exchanger, the second on-off valve, the second throttling element, the second indoor heat exchanger, the second four-way valve and the gas inlet of the compressor.

In addition to one or more of the above features, or as an alternative, in another embodiment, the control method further comprises: a whole region heating mode of switching the flow direction of the first four-way valve and the second four-way valve, connecting the pipeline connection between the first four-way valve and the second four-way valve and the gas outlet of the compressor, turning on the first on-off valve and the second on-off valve, and disconnecting the section flow path, so that the first part of refrigerant flows sequentially through the gas outlet of the compressor, the first four-way valve, the first indoor heat exchanger, the first throttling element, the first on-off valve, the outdoor heat exchanger, the first four-way valve and the gas inlet of the compressor; and the second part of refrigerant flows sequentially through the gas outlet of the compressor, the second four-way valve, the second indoor heat exchanger, the second throttling element, the second on-off valve, the outdoor heat exchanger, the second four-way valve and the gas inlet of the compressor.

In addition to one or more of the above features, or as an alternative, in another embodiment, the control method further comprises: a specific zone cooling mode of alternatively connecting the pipeline connection between the first four-way valve or the second four-way valve and the gas outlet of the compressor, turning on the first on-off valve or the second on-off valve accordingly, and disconnecting the section flow path, so that the refrigerant flows sequentially through the gas outlet of the compressor, the first four-way valve, the outdoor heat exchanger, the first on-off valve, the first throttling element, the first indoor heat exchanger, the first four-way valve and the gas inlet of the compressor; or the refrigerant flows sequentially through the gas outlet of the compressor, the second four-way valve, the outdoor heat exchanger, the second on-off valve, the second throttling element, the second indoor heat exchanger, the second four-way valve and the gas inlet of the compressor.

In addition to one or more of the above features, or as an alternative, in another embodiment, the control method further comprises: a specific zone heating mode of alternatively switching the first four-way valve or the second four-way valve to connect the pipeline connection between the first four-way valve or the second four-way valve and the gas outlet of the compressor accordingly, turning on the first on-off valve or the second on-off valve accordingly, and disconnecting the section flow path, so that the refrigerant flows sequentially through the gas outlet of the compressor, the first four-way valve, the first indoor heat exchanger, the first throttling element, the first on-off valve, the outdoor heat exchanger, the first four-way valve and the gas inlet of the compressor; or the refrigerant flows sequentially through the gas outlet of the compressor, the second four-way valve, the second indoor heat exchanger, the second throttling element, the second on-off valve, the outdoor heat exchanger, the second four-way valve and the gas inlet of the compressor.

To achieve at least one object of the present application, according to one aspect of the present application, a transport refrigeration vehicle is provided, which comprises: the multi-temperature air conditioning system as mentioned above; a plurality of compartment zones independent of each other; wherein the first indoor unit or the second indoor unit is arranged alternatively in each compartment zone.

The multi-temperature air conditioning system according to the present application, by arranging the first indoor unit and the second indoor unit which are respectively connected with the outdoor unit, and arranging a section flow path between the first indoor unit and the second indoor unit, achieves the interconnection between the three, making it possible to realize the cooling and heating control of the first indoor unit and the second indoor unit in different zones. On this basis, the control method can be achieved by adjusting the flow direction and connection or disconnection of the respective flow paths. In addition, the transport refrigeration vehicle using such multi-temperature air conditioning system can achieve independent temperature regulation in different compartment zones, thereby improving the adaptability and application range of constant temperature storage of the compartments.

BRIEF DESCRIPTION OF THE DRAWINGS

FIG. 1 is a system schematic diagram of an embodiment of the multi-temperature air conditioning system according to the present invention.

DETAILED DESCRIPTION OF THE EMBODIMENT(S) OF THE INVENTION

The present application will be described in detail hereinafter with reference to the exemplary embodiments shown in the accompanying drawings. However, it should be understood that the present application can be implemented in many different forms, and should not be construed as being limited to the embodiments set forth herein. These embodiments are provided here for the purpose of making the disclosure of the present application more complete and comprehensive, and fully conveying the concept of the present application to those skilled in the art.

FIG. 1 shows an embodiment of a multi-temperature air conditioning system. The multi-temperature air conditioning system 100 comprises an outdoor unit 130, a first indoor unit 110, and a second indoor unit 120. The outdoor unit 130 is connected with the first indoor unit 110 and the second indoor unit 120 respectively to form a complete refrigerant flow path. At the same time, the multi-temperature air conditioning system 100 further comprises a section flow path 140 capable of being connected to or disconnected from the flow path between the first indoor unit 110 and the second indoor unit 120, so that it is possible to connect the outdoor unit 130, the first indoor unit 110 and the second indoor unit 120 in sequence to form a complete refrigerant flow path, Specifically, a compressor 131, a first four-way valve 132 corresponding to the first indoor unit 110, a second four-way valve 133 corresponding to the second indoor unit 120, and an outdoor heat exchanger 134 connected through pipelines are arranged in the outdoor unit 130; a first indoor heat exchanger 111, a first throttling element 112 and a first on-off valve 113 are respectively arranged in the first indoor unit 110; and a second indoor heat exchanger 121, a second throttling element 122 and a second on-off valve 123 are respectively arranged in the second indoor unit 120. Wherein a first end of the first indoor heat exchanger 111 is connected to the outdoor heat exchanger 134 through the first throttling element 112 and the first on-off valve 113, and a second end of the first indoor heat exchanger 111 is connected to the compressor 131 through the first four-way valve 132; a first end of the second indoor heat exchanger 121 is connected to the outdoor heat exchanger 134 through the second throttling element 122 and the second on-off valve 123, and a second end of the second indoor heat exchanger 121 is connected to the compressor 131 through the second four-way valve 133. In addition, the section flow path 140 connects the first indoor unit 110 between the first throttling element 112 and the first on-off valve 113, and connects the second indoor unit 120 between the second throttling element 122 and the second on-off valve 123.

Wherein the indoor unit and the outdoor unit mentioned herein refer to the temperature regulation zones including the heat exchangers. The indoor unit usually refers to the target section for temperature regulation, while the outdoor unit usually refers to the heat absorption/heat dissipation section for achieving heat balance during temperature regulation. Taking a transport vehicle as an example, the indoor unit mentioned above refers to each compartment zone in the vehicle for storing goods or the cab, while the outdoor unit may refer to the location inside or outside the vehicle where temperature regulation is not required.

The multi-temperature air conditioning system under this arrangement, by arranging the first indoor unit and the second indoor unit which are connected with the outdoor unit respectively, and by arranging the section flow path between the first indoor unit and the second indoor unit, achieves the interconnection between the three, so that it is possible to realize cooling and heating control for the first indoor unit and the second indoor unit in different zones. Although a first indoor unit 110 and a second indoor unit 120 are illustrated as examples in the FIGURE, it should be appreciated that they can refer to a kind of indoor units having component configuration with common characteristics. Therefore, the multi-temperature air conditioning system and the control method described below can be applied to the layout scheme having two or more indoor units.

Various possible modifications of the multi-temperature air conditioning system will be described below in conjunction with the accompanying drawings. In addition, in order to further improve system efficiency or reliability, some components can be additionally added, as also exemplified below.

For example, as a specific embodiment of the section flow path 140, it may further comprise a first section on-off control valve 141 located in the first indoor unit 110 and a second section on-off control valve 142 located in the second indoor unit 120. As such, the flow path can be disconnected by turning off any control valve, and the flow path can be connected by turning on all control valves.

In addition, in order to achieve the switch function between various operating modes of the multi-temperature air conditioning system 100, specific connection schemes for the first four-way valve and the second four-way valve can be illustrated. In the example, the first four-way valve 132 is respectively connected to the gas inlet 131a of the compressor 131, the outdoor heat exchanger 134, the first indoor heat exchanger 111, and is capable of being connected to or disconnected from the gas outlet 131b of the compressor 131; and the gas outlet 131b of the compressor 131 can be connected to the outdoor heat exchanger 134 or the first indoor heat exchanger 111 respectively by switching the flow path. In another example, the second four-way valve 133 is respectively connected to the gas inlet 131a of the compressor 131, the outdoor heat exchanger 134, the second indoor heat exchanger 121, and is capable of being connected to or disconnected from the gas outlet 131b of the compressor 131; and the gas outlet 131b of the compressor 131 can be connected to the outdoor heat exchanger 134 or the second indoor heat exchanger 121 respectively by switching the flow path. Wherein the four-way valve usually has a default connection state and a connection state after power-on switch. In this embodiment, the four-way valve is regarded as in the default connection state, when connecting the gas outlet 131b of the compressor 131 and the outdoor heat exchanger 134, and connecting the gas inlet 131a of the compressor 131 and the indoor heat exchanger; and the four-way valve is regarded as in the connection state after power-on switch, when connecting the gas outlet 131b of the compressor 131 and the indoor heat exchanger, and connecting the gas inlet 131a of the compressor 131 and the outdoor heat exchanger 134. Of course, those skilled in the art can also make modifications as needed.

In addition, for the purpose of improving system efficiency or reliability, several components or flow paths can be added to the multi-temperature air conditioning system, as also exemplified below. For example, the multi-temperature air conditioning system may further comprise a gas-liquid separator 135 arranged upstream of the gas inlet 131a of the compressor 131, which is used to perform gas-liquid separation before the refrigerant enters the compressor, so as to prevent liquid-phase refrigerant from entering the compressor and causing liquid hammer. For another example, the flow path connected between the outdoor heat exchanger 134 and the first throttling element 112 and the second throttling element 122 is also arranged as a subcooling flow path, which flows through the interior of the gas-liquid separator 135 to achieve refrigerant subcooling. In addition, a subcooler 136 can also be arranged between the outdoor heat exchanger 134 and the subcooling flow path, which can also be used for refrigerant subcooling.

Furthermore, a liquid reservoir 137 and a dry filter 139 can be arranged in the multi-temperature air conditioning system for liquid storage, drying and filtering, respectively. Specifically, the liquid reservoir 137 is arranged between the outdoor heat exchanger 134 and the subcooler 136, while the dry filter 139 is arranged between the subcooler 136 and the subcooling flow path.

At the same time, in order to achieve the control of connecting or disconnecting each flow path in the outdoor unit, a first exhaust control valve 138a and a second exhaust control valve 138b are arranged, and a gas suction control valve 138c is additionally arranged. Wherein the first exhaust control valve 138a is arranged between the gas outlet 131b of the compressor 131 and the first four-way valve 132, the second exhaust control valve 138b is arranged between the gas outlet 131b of the compressor 131 and the second four-way valve 133, and the gas suction control valve 138c is arranged between the gas inlet 131a of the compressor 131 and the gas-liquid separator 135. Therefore, the diversification of control modes can be realized by regulating the connection or disconnection of these flow paths.

A control method for the multi-temperature air conditioning system 100 will be described below in conjunction with FIG. 1.

For example, when the multi-temperature air conditioning system executes the first zone cooling and heating mode, the first four-way valve 132 and the second four-way valve 133 are switched alternatively, so that the gas outlet 131b of the compressor 131 is communicated with either the first indoor unit 110 or the second indoor unit 120, and the other one of the first indoor unit 110 or the second indoor unit 120 is communicated with the gas inlet 131a of the compressor 131. At the same time, the first on-off valve 113 and the second on-off valve 123 are disconnected, and the section flow path 140 is connected.

Specifically, when it is necessary to heat the first indoor unit 110 and cool the second indoor unit 120, the first exhaust control valve 138a and the gas suction control valve 138c are connected, and the second exhaust control valve 138b is disconnected.

At this point, the refrigerant first enters the compressor 131 for gas-phase compression. Then, the refrigerant flows from the gas outlet 131b of the compressor 131 through the first four-way valve 132 to the first indoor heat exchanger 111 in the first indoor unit 110, thus providing heating for the first indoor unit 110 accordingly. The refrigerant then flows through the first throttling element 112, passes through the section flow path 140 having the first section on-off control valve 141 and the second section on-off control valve 142 that are connected, and then enters the second indoor heat exchanger 121 for evaporation and heat absorption after being throttled and expanded by the second throttling element 122, thus providing cooling for the second indoor unit 120. The refrigerant that has completed its work then flows through the second branch 124 and the second four-way valve 133, and returns to the gas inlet 131a of the compressor 131 after passing through the gas-liquid separator 135 and the gas suction control valve 138c, thus completing the cycle.

As another example, when it is necessary to heat the second indoor unit 120 and cool the first indoor unit 110, the second exhaust control valve 138b and the gas suction control valve 138c are connected, and the first exhaust control valve 138a is disconnected.

At this point, the refrigerant first enters the compressor 131 for gas-phase compression. Then, the refrigerant flows from the gas outlet 131b of the compressor 131 through the second four-way valve 133 to the second indoor heat exchanger 121 in the second indoor unit 120, thus providing heating for the second indoor unit 120 accordingly. The refrigerant then flows through the second throttling element 122, passes through the section flow path 140 having the second section on-off control valve 142 and the first section on-off control valve 141 that are connected, and then enters the first indoor heat exchanger 111 for evaporation and heat absorption after being throttled and expanded by the first throttling element 112, thus providing cooling for the first indoor unit 110. The refrigerant that has completed its work then flows through the first branch 114 and the first four-way valve 132, and returns to the gas inlet 131a of the compressor 131 after passing through the gas-liquid separator 135 and the gas suction control valve 138c, thus completing the cycle.

With continued reference to FIG. 1, when the multi-temperature air conditioning system executes the second zone cooling and heating mode, the first four-way valve 132 and the second four-way valve 133 are switched alternatively, so that the gas outlet 131b of the compressor 131 is communicated with the outdoor heat exchanger 134, the gas outlet 131b of the compressor 131 is communicated with either the first indoor unit 110 or the second indoor unit 120, and the other one of the first indoor unit 110 or the second indoor unit 120 is communicated with the gas inlet 131a of the compressor 131. At the same time, the first on-off valve 113 or the second on-off valve 123 is disconnected accordingly, and the section flow path 140 is connected.

Specifically, when it is necessary to cool the first indoor unit 110 and heat the second indoor unit 120, the first exhaust control valve 138a, the second exhaust control valve 138b and the gas suction control valve 138c are connected, and the second on-off valve 123 is disconnected.

At this point, the refrigerant first enters the compressor 131 for gas-phase compression. Then, a first part of the refrigerant flows from the gas outlet 131b of the compressor 131 through the first four-way valve 132 to the outdoor heat exchanger 134 for condensation and heat dissipation. The refrigerant then flows through the first on-off valve 113 to the first throttling element 112, and enters the first indoor heat exchanger 111 for evaporation and heat absorption after being throttled and expanded by the first throttling element 112, thus providing cooling for the first indoor unit 110. The refrigerant that has completed its work then flows through the first branch 114 and the first four-way valve 132, and returns to the gas inlet 131a of the compressor 131 after passing through the gas-liquid separator 135 and the gas suction control valve 138c, thus completing the cycle.

A second part of the refrigerant flows from the gas outlet 131b of the compressor 131 through the second four-way valve 133 to the second indoor heat exchanger 121 in the second indoor unit 120, thus providing heating for the second indoor unit 120 accordingly. The refrigerant then flows through the second throttling element 122, passes through the section flow path 140 having the second section on-off control valve 142 and the first section on-off control valve 141 that are connected, and then enters the first indoor heat exchanger 111 for evaporation and heat absorption after being throttled and expanded by the first throttling element 112, thus providing cooling for the first indoor unit 110. The refrigerant that has completed its work then flows through the first branch 114 and the first four-way valve 132, and returns to the gas inlet 131a of the compressor 131 after passing through the gas-liquid separator 135 and the gas suction control valve 138c, thus completing the cycle.

As another example, when it is necessary to heat the first indoor unit 110 and cool the second indoor unit 120, the first exhaust control valve 138a, the second exhaust control valve 138b and the gas suction control valve 138c are connected, and the first on-off valve 113 is disconnected.

At this point, the refrigerant first enters the compressor 131 for gas-phase compression. Then, a first part of the refrigerant flows from the gas outlet 131b of the compressor 131 through the first four-way valve 132 to the first indoor heat exchanger 111 in the first indoor unit 110, thus provides heating for the first indoor unit 110 accordingly. The refrigerant then flows through the first throttling element 112, passes through the section flow path 140 having the first section on-off control valve 141 and the second section on-off control valve 142 that are connected, and then enters the second indoor heat exchanger 121 for evaporation and heat absorption after being throttled and expanded by the second throttling element 122, thus providing cooling for the second indoor unit 120. The refrigerant that has completed its work then flows through the second branch 124 and the second four-way valve 133, and returns to the gas inlet 131a of the compressor 131 after passing through the gas-liquid separator 135 and the gas suction control valve 138c, thus completing the cycle.

The second part of the refrigerant flows from the gas outlet 131b of the compressor 131 through the second four-way valve 133 to the outdoor heat exchanger 134 for condensation and heat dissipation. This part of refrigerant then flows through the second on-off valve 123 to the second throttling element 122, and enters the second indoor heat exchanger 121 for evaporation and heat absorption after being throttled and expanded by the second throttling element 122, thus providing cooling for the second indoor unit 120. The refrigerant that has completed its work then flows through the second branch 124 and the second four-way valve 133, and returns to the gas inlet 131a of the compressor 131 after passing through the gas-liquid separator 135 and the gas suction control valve 138c, thus completing the cycle.

It should be appreciated that both the first throttling element 112 and the second throttling element 122 can play the role of throttling expansion. However, it is also possible that one of them can also be fully connected, while the other can adjust the opening to play the role of throttling expansion.

The control method for the multi-temperature air conditioning system as mentioned above, by controlling the flow direction and on-off of the respective valves, realizes the guidance of the flow paths between the outdoor unit, the first indoor unit and the second indoor unit, so that the multi-temperature air conditioning system can realize the cooling and heating control for the first indoor unit and the second indoor unit in different zones.

Of course, the multi-temperature air conditioning system can also achieve the whole region cooling mode, the whole region heating mode, the specific zone cooling mode and the specific zone heating mode. An exemplary description will be given below in conjunction with FIG. 1.

With continued reference to FIG. 1, specifically, when the whole region cooling mode is executed, that is, when cooling is performed for both the first indoor unit 110 and the second indoor unit 120, the gas outlet 131b of the compressor 131 is communicated with the outdoor heat exchanger 134, and the first indoor unit 110 and the second indoor unit 120 are communicated with the gas inlet 131a of the compressor 131 respectively. At the same time, the first on-off valve 113 and the second on-off valve 123 are connected, and the section flow path 140 is disconnected. In addition, the first exhaust control valve 138a, the second exhaust control valve 138b and the gas suction control valve 138c are connected.

At this point, the refrigerant first enters the compressor 131 for gas-phase compression. Then, the first part of the refrigerant flows from the gas outlet 131b of the compressor 131 through the first four-way valve 132 to the outdoor heat exchanger 134 for condensation and heat dissipation. The refrigerant then flows through the first on-off valve 113 to the first throttling element 112, and enters the first indoor heat exchanger 111 for evaporation and heat absorption after being throttled and expanded by the first throttling element 112, thus providing cooling for the first indoor unit 110. The refrigerant that has completed its work then flows through the first branch 114 and the first four-way valve 132, and returns to the gas inlet 131a of the compressor 131 after passing through the gas-liquid separator 135 and the gas suction control valve 138c, thus completing the cycle.

The second part of the refrigerant flows from the gas outlet 131b of the compressor 131 through the second four-way valve 133 to the outdoor heat exchanger 134 for condensation and heat dissipation. This part of refrigerant then flows through the second on-off valve 123 to the second throttling element 122, and enters the second indoor heat exchanger 121 for evaporation and heat absorption after being throttled and expanded by the second throttling element 122, thus providing cooling for the second indoor unit 120. The refrigerant that has completed its work then flows through the second branch 124 and the second four-way valve 133, and returns to the gas inlet 131a of the compressor 131 after passing through the gas-liquid separator 135 and the gas suction control valve 138c, thus completing the cycle.

When the whole region heating mode is executed, that is, when heating is performed for both the first indoor unit 110 and the second indoor unit 120, the flow directions of the first four-way valve 132 and the second four-way valve 133 are switched, so that the gas outlet 131b of the compressor 131 is communicated with the first indoor unit 110 and the second indoor unit 120 respectively, and the outdoor heat exchanger 134 is communicated with the gas inlet 131a of the compressor 131. At the same time, the first on-off valve 113 and the second on-off valve 123 are connected, and the section flow path 140 is disconnected. In addition, the first exhaust control valve 138a, the second exhaust control valve 138b and the gas suction control valve 138c are connected.

At this point, the refrigerant first enters the compressor 131 for gas-phase compression. Then, the first part of the refrigerant flows from the gas outlet 131b of the compressor 131 through the first four-way valve 132 and the first branch 114 to the first indoor heat exchanger 111, thus provides heating for the first indoor unit 110. The refrigerant that has completed its work then flows through the first throttling element 112, enters the outdoor heat exchanger 134 through the first on-off valve 113 for evaporation and heat absorption after being throttled and expanded by the first throttling element 112, and then returns to the gas inlet 131a of the compressor 131 after passing through the first four-way valve 132, the gas-liquid separator 135 and the gas suction control valve 138c, thus completing the cycle.

The second part of the refrigerant flows from the gas outlet 131b of the compressor 131 through the second four-way valve 133 and the second branch 124 to the second indoor heat exchanger 121, thus providing heating for the second indoor unit 120. The refrigerant that has completed its work then flows through the second throttling element 122, enters the outdoor heat exchanger 134 through the second on-off valve 123 for evaporation and heat absorption after being throttled and expanded by the second throttling element 122, and then returns to the gas inlet 131a of the compressor 131 after passing through the second four-way valve 133, the gas-liquid separator 135 and the gas suction control valve 138c, thus completing the cycle.

When the specific zone cooling mode is executed, that is, when cooling is performed for a specific one of the first indoor unit 110 or the second indoor unit 120, the gas outlet 131b of the compressor 131 is communicated with the outdoor heat exchanger 134, and a specific one of the first indoor unit 110 or the second indoor unit 120 is communicated with the gas inlet 131a of the compressor 131. At the same time, a specific one of the first on-off valve 113 and the second on-off valve 123 is connected, and the section flow path 140 is disconnected. In addition, a specific one of the first exhaust control valve 138a or the second exhaust control valve 138b is connected, and the gas suction control valve 138c is connected.

If the specific zone cooling mode is executed with the first indoor unit 110 as the target object, the refrigerant first enters the compressor 131 for gas-phase compression. Then, the refrigerant flows from the gas outlet 131b of the compressor 131 through the first four-way valve 132 to the outdoor heat exchanger 134 for condensation and heat dissipation. The refrigerant then flows through the first throttling element 112 via the first on-off valve 113, and enters the first indoor heat exchanger 111 for evaporation and heat absorption after being throttled and expanded by the first throttling element 112, thus providing cooling for the first indoor unit 110. The refrigerant that has completed its work then flows through the first branch 114 and the first four-way valve 132, and then returns to the gas inlet 131a of the compressor 131 after passing through the gas-liquid separator 135 and the gas suction control valve 138c, thus completing the cycle.

If the specific zone cooling mode is executed with the second indoor unit 120 as the target object, the refrigerant flows from the gas outlet 131b of the compressor 131 through the second four-way valve 133 to the outdoor heat exchanger 134 for condensation and heat dissipation. This part of refrigerant then flows through the second on-off valve 123 to the second throttling element 122, and enters the second indoor heat exchanger 121 for evaporation and heat absorption after being throttled and expanded by the second throttling element 122, thus providing cooling for the second indoor unit 120. The refrigerant that has completed its work then flows through the second branch 124 and the second four-way valve 133, and returns to the gas inlet 131a of the compressor 131 after passing through the gas-liquid separator 135 and the gas suction control valve 138c, thus completing the cycle.

When the specific zone heating mode is executed, that is, when heating is performed for a specific one of the first indoor unit 110 or the second indoor unit 120, the flow directions of the first four-way valve 132 and the second four-way valve 133 are switched alternatively, so that the gas outlet 131b of the compressor 131 is communicated with a specific one of the first indoor unit 110 or the second indoor unit 120, and the outdoor heat exchanger 134 is communicated with the gas inlet 131a of the compressor 131. At the same time, a specific one of the first on-off valve 113 or the second on-off valve 123 is connected, and the section flow path 140 is disconnected. In addition, a specific one of the first exhaust control valve 138a or the second exhaust control valve 138b is connected, and the gas suction control valve 138c is connected.

If the specific zone heating mode is in executed with the first indoor unit 110 as the target object, the refrigerant first enters the compressor 131 for gas-phase compression. Then, the refrigerant flows from the gas outlet 131b of the compressor 131 through the first four-way valve 132 and the first branch 114 to the first indoor heat exchanger 111, thus providing heating for the first indoor unit 110. The refrigerant that has completed its work then flows through the first throttling element 112, enters the outdoor heat exchanger 134 through the first on-off valve 113 for evaporation and heat absorption after being throttled and expanded by the first throttling element 112, and then returns to the gas inlet 131a of the compressor 131 after passing through the first four-way valve 132, the gas-liquid separator 135 and the gas suction control valve 138c, thus completing the cycle.

If the specific zone heating mode is executed with the second indoor unit 120 as the target object, the refrigerant flows from the gas outlet 131b of the compressor 131 through the second four-way valve 133 and the second branch 124 to the second indoor heat exchanger 121, thus providing heating for the second indoor unit 120. The refrigerant that has completed its work then flows through the second throttling element 122, enters the outdoor heat exchanger 134 through the second on-off valve 123 for evaporation and heat absorption after being throttled and expanded by the second throttling element 122, and then returns to the gas inlet 131a of the compressor 131 after passing through the second four-way valve 133, the gas-liquid separator 135 and the gas suction control valve 138c, thus completing the cycle.

It should be appreciated that although the embodiments of the control method for the multi-temperature air conditioning system is described in a certain order, these steps are not necessarily performed in the order described. Unless explicitly stated herein, there is no strict restriction in terms of the order of carrying out these steps. Instead, these steps can be carried out in other order. In addition, at least one part of the steps of the method may include multiple sub-steps or stages, which may not necessarily be executed at the same time but may be executed at different times, and may not necessarily be executed sequentially but may be executed in turn or alternately with other steps or sub-steps of other stages or at least one part of the stages.

In addition, although not shown in the FIGURE, an embodiment of a transport refrigeration vehicle is further provided here. The transport refrigeration vehicle comprises the multi-temperature air conditioning system 100 in any of the aforementioned embodiments or combinations thereof, so it also has its technical effect accordingly, which will not be repeated here. Furthermore, the transport refrigeration vehicle also comprises a plurality of compartment zones independent of each other; and the first indoor unit 110 or the second indoor unit 120 can be arranged alternatively in each compartment zone. The transport refrigeration vehicles under this arrangement can realize independent temperature control of the respective compartment zones, and can execute the cooling and heating modes respectively, thus improving the application scope of such transport refrigeration vehicles.

The above examples mainly illustrate a multi-temperature air conditioning system, a control method thereof and a transport refrigeration vehicle according to the present invention. Although only some of the embodiments of the present invention are described, those skilled in the art should understand that the present invention can, without departing from the spirit and scope of the present invention, be implemented in many other forms. Therefore, the illustrated examples and embodiments are to be considered as illustrative but not restrictive, and the present invention may cover various modifications or replacements if not departed from the spirit and scope of the present invention as defined by the appended claims.

What is claimed is:

1. A multi-temperature air conditioning system, comprising:
   an outdoor unit, in which a compressor, a first four-way valve, a second four-way valve and an outdoor heat exchanger connected through pipelines are arranged;
   a first indoor unit, in which a first indoor heat exchanger, a first throttling element and a first on-off valve are respectively arranged, wherein a first end of the first indoor heat exchanger is connected to the outdoor heat exchanger through the first throttling element and the first on-off valve, and a second end of the first indoor heat exchanger is connected to the compressor through the first four-way valve; and
   a second indoor unit, in which a second indoor heat exchanger, a second throttling element and a second on-off valve are respectively arranged, wherein a first end of the second indoor heat exchanger is connected to the outdoor heat exchanger through the second throttling element and the second on-off valve, and a second end of the second indoor heat exchanger is connected to the compressor through the second four-way valve;
   wherein the first four-way valve is respectively connected to a gas inlet of the compressor, the outdoor heat exchanger, the first indoor heat exchanger, and is capable of being connected to or disconnected from a gas outlet of the compressor; the second four-way valve is respectively connected to the gas inlet of the compressor, the outdoor heat exchanger, the second indoor heat exchanger, and is capable of being connected to or disconnected from the gas outlet of the compressor; and
   wherein a section flow path capable of being connected or disconnected is further included, wherein the section flow path connects to the first indoor unit between the first throttling element and the first on-off valve, and the section flow path connects to the second indoor unit between the second throttling element and the second on-off valve.

2. The multi-temperature air conditioning system according to claim 1, wherein the section flow path comprises: a first section on-off control valve located in the first indoor unit; and a second section on-off control valve located in the second indoor unit.

3. The multi-temperature air conditioning system according to claim 1, further comprising:
   a gas-liquid separator arranged upstream of the gas inlet of the compressor;
   a subcooling flow path connected between the outdoor heat exchanger and the first throttling element and the second throttling element, wherein the subcooling flow path flows through the interior of the gas-liquid separator; and
   a subcooler arranged between the outdoor heat exchanger and the first throttling element and the second throttling element.

4. A control method for the multi-temperature air conditioning system according to claim 1, comprising:
   a first zone cooling and heating mode of alternatively switching the first four-way valve or the second four-way valve to connect a pipeline connection between the first four-way valve or the second four-way valve and the gas outlet of the compressor accordingly, turning off the first on-off valve and the second on-off valve, and connecting the section flow path, so that refrigerant flows sequentially through the gas outlet of the compressor, the first four-way valve, the first indoor heat exchanger, the first throttling element, the section flow path, the second throttling element, the second indoor heat exchanger, the second four-way valve and the gas inlet of the compressor; or the refrigerant flows sequentially through the gas outlet of the compressor, the second four-way valve, the second indoor heat exchanger, the second throttling element, the section flow path, the first throttling element, the first indoor heat exchanger, the first four-way valve and the gas inlet of the compressor.

5. The control method according to claim 4, further comprising:
   a second zone cooling and heating mode of alternatively switching the first four-way valve or the second four-way valve to connect pipeline connections between the first four-way valve and the second four-way valve and the gas outlet of the compressor, turning off the first on-off valve or the second on-off valve accordingly, and connecting the section flow path, so that a first part of refrigerant flows sequentially through the gas outlet of the compressor, the first four-way valve, the outdoor heat exchanger, the first on-off valve, the first throttling element, the first indoor heat exchanger, the first four-way valve and the gas inlet of the compressor; and a second part of refrigerant flows sequentially through the gas outlet of the compressor, the second four-way valve, the second indoor heat exchanger, the second throttling element, the section flow path, the first throttling element, the first indoor heat exchanger, the first four-way valve and the gas inlet of the compressor; or the first part of refrigerant flows sequentially through the gas outlet of the compressor, the second four-way valve, the outdoor heat exchanger, the second on-off valve, the second throttling element, the second indoor heat exchanger, the second four-way valve and the gas inlet of the compressor; and the second part of refrigerant flows sequentially through the gas outlet of the compressor, the first four-way valve, the first indoor heat exchanger, the first throttling element, the section flow path, the second throttling element, the second indoor heat exchanger, the second four-way valve and the gas inlet of the compressor.

6. The control method according to claim 4, further comprising:
   a whole region cooling mode of connecting the pipeline connections between the first four-way valve and the second four-way valve and the gas outlet of the compressor, turning on the first on-off valve and the second on-off valve, and disconnecting the section flow path, so that the first part of refrigerant flows sequentially through the gas outlet of the compressor, the first four-way valve, the outdoor heat exchanger, the first on-off valve, the first throttling element, the first indoor heat exchanger, the first four-way valve and the gas inlet of the compressor; and the second part of refrigerant flows sequentially through the gas outlet of the compressor, the second four-way valve, the outdoor heat exchanger, the second on-off valve, the second throttling element, the second indoor heat exchanger, the second four-way valve and the gas inlet of the compressor.

7. The control method according to claim 4, further comprising:
- a whole region heating mode of switching flow directions of the first four-way valve and the second four-way valve, connecting the pipeline connections between the first four-way valve and the second four-way valve and the gas outlet of the compressor, turning on the first on-off valve and the second on-off valve, and disconnecting the section flow path, so that the first part of refrigerant flows sequentially through the gas outlet of the compressor, the first four-way valve, the first indoor heat exchanger, the first throttling element, the first on-off valve, the outdoor heat exchanger, the first four-way valve and the gas inlet of the compressor; and the second part of refrigerant flows sequentially through the gas outlet of the compressor, the second four-way valve, the second indoor heat exchanger, the second throttling element, the second on-off valve, the outdoor heat exchanger, the second four-way valve and the gas inlet of the compressor.

8. The control method according to claim 4, further comprising:
- a specific zone cooling mode of alternatively connecting the pipeline connection between the first four-way valve or the second four-way valve and the gas outlet of the compressor, turning on the first on-off valve or the second on-off valve accordingly, and disconnecting the section flow path, so that the refrigerant flows sequentially through the gas outlet of the compressor, the first four-way valve, the outdoor heat exchanger, the first on-off valve, the first throttling element, the first indoor heat exchanger, the first four-way valve and the gas inlet of the compressor; or the refrigerant flows sequentially through the gas outlet of the compressor, the second four-way valve, the outdoor heat exchanger, the second on-off valve, the second throttling element, the second indoor heat exchanger, the second four-way valve and the gas inlet of the compressor.

9. The control method according to claim 4, further comprising:
- a specific zone heating mode of alternatively switching the first four-way valve or the second four-way valve to connect the pipeline connection between the first four-way valve or the second four-way valve and the gas outlet of the compressor accordingly, turning on the first on-off valve or the second on-off valve accordingly, and disconnecting the section flow path, so that the refrigerant flows sequentially through the gas outlet of the compressor, the first four-way valve, the first indoor heat exchanger, the first throttling element, the first on-off valve, the outdoor heat exchanger, the first four-way valve and the gas inlet of the compressor; or the refrigerant flows sequentially through the gas outlet of the compressor, the second four-way valve, the second indoor heat exchanger, the second throttling element, the second on-off valve, the outdoor heat exchanger, the second four-way valve and the gas inlet of the compressor.

10. A transport refrigeration vehicle, comprising:
- the multi-temperature gas conditioning system according to claim 1;
- a plurality of compartment zones independent of each other; wherein the first indoor unit or the second indoor unit is arranged alternatively in each compartment zone.

* * * * *